A. McCOMBIE.
ROTATABLE HYDRAULIC NOZZLE.
APPLICATION FILED NOV. 5, 1908.

1,012,398.

Patented Dec. 19, 1911.

Alexander McCombie, Inventor

Witnesses

UNITED STATES PATENT OFFICE.

ALEXANDER McCOMBIE, OF GRASS VALLEY, CALIFORNIA.

ROTATABLE HYDRAULIC NOZZLE.

1,012,398. Specification of Letters Patent. Patented Dec. 19, 1911.

Application filed November 5, 1908. Serial No. 461,197.

*To all whom it may concern:*

Be it known that I, ALEXANDER McCOMBIE, a citizen of the United States, residing at Grass Valley, in the county of Nevada and State of California, have invented a new and useful Rotatable Hydraulic Nozzle, of which the following is a specification.

My invention relates to nozzles for hydraulic monitors, stand pipes, water towers, or like structures in which a nozzle is connected to and movable with relation to its feed pipe, the object of my invention being to provide a nozzle which is connected to the feed pipe or stand pipe by a universal joint so as to allow the nozzle to have a movement of rotation around the axis of the feed pipe, and an independent rotating movement in a plane at right angles to the plane of the first rotation. This allows the nozzle to be directed to any quarter desired and to be elevated to any degree vertically and directed to any point of a circle horizontally. My peculiar construction also allows the nozzle to have a complete rotary movement in any direction, the nozzle being entirely clear and there being no obstruction with which it will contact in its movement around a complete circle. The pressure of the water passing through the nozzle of hydraulic apparatus of this character is very great, and as the water has to make a right-angled turn in passing from the stand pipe to the nozzle, the upward strain is also great, causing the swiveling joint on which the nozzle turns to bind, holding the nozzle set and preventing the nozzle from being rotated in either plane. To overcome this difficulty I provide a plurality of swiveling couplings containing antifriction balls and so construct each coupling that one member thereof shall be forced against the balls by the force of the water passing through the pipes.

Figure 1:
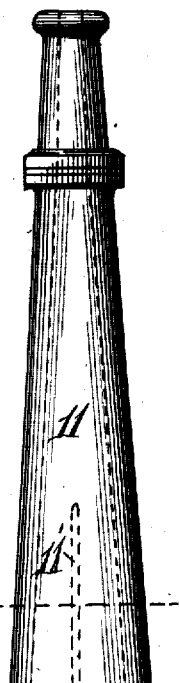
Figure 2:
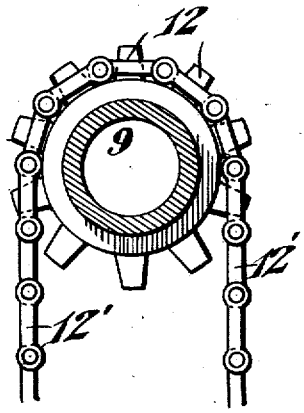
Figure 3:
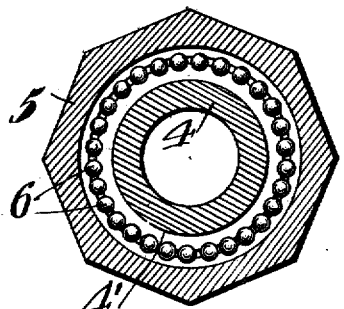
Figure 4:
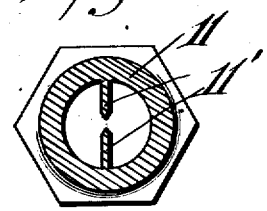

In the drawings, I have shown two forms of my invention, Figure 1 being a side elevation thereof partly broken away; Fig. 2 a section on the line 2—2 of Fig. 1; Fig. 3 a section on line 3—3; Fig. 4 a section on line 4—4 of Fig. 1; and Fig. 5 a central longitudinal section of a modified form of coupling.

Similar reference numerals designate corresponding parts in all the figures of the drawings.

Referring to these drawings, the standpipe 2 may be part of any desired apparatus, as for instance a water tower, fire hydrant, or a supply pipe of a monitor. Into the upper end of the stand pipe is screw threaded one member 3 of a coupling, the upper end of which is outwardly flanged as at 3'. The circumferential edge of this flange is screw threaded. The opposed member 4 of the coupling, is also provided at its end with an outwardly projecting flange 4' which is, however less in diameter than the flange 3' and is plain or non-threaded. The member 3 is held to the member 4 by a sleeve 5 screw threaded for engagement with the screw threads of the flange 3' and having an inwardly turned flange 5' at the other end which engages over the outwardly projecting flange 4' of the member 4. Raceways are formed in the opposed faces of the flanges 5' and 4', and anti-friction balls 6 are carried therein. An annular shoulder 5'' is formed on the interior of the nut 5 between the flange and the screw threaded portion which when the nut is in place projects over the flange 3' and engages with a packing ring 7 of rubber, leather or other suitable material.

It will be seen from the section of Fig. 1 that the upper face of the flange 3' of the lower member 3 is cut away as at 3'' at the junction of the upper face of the flange with the central passage, and that the lower face of the flange 4' is provided with a downwardly projecting rib or hub 4'' at the junction of the central passage of the member 4 with the flange 4'. This hub or rib is coincident with the cut-away portion of the flange 3'. This respective flange and cut away portion act to bend downwardly the interior edge of the annular packing ring 7, but in Fig. 1, the space left between the cut away portion and the face of the flange 4' is greater than the thickness of the packing ring and the curved under surface of the rib 4'' acts to turn the packing ring upward and to give it an upward bend on its inner edge, leaving a space between the lower face of the packing and the upper face of the cut-away portion 3''. The effect of this is that when the water passes into the coupling, the up-rush thereof and the pressure act to force the packing ring upward against the rib 4'' and the water enters the space between the lower face of the packing ring and the upper face of the cut away portion 3'', the water thus wedging into this space, and forcing upwardly the member 4 against the under face of the flange 5' of the nut. Hence the upward strain of the water will be borne by the antifriction balls 6 which permit the coupling member 4 to revolve easily within the nut 5, this nut being to all intents and purposes a part of the coupling member 3.

At its upper end the coupling member 4 is screw threaded for engagement with an elbow 8 whose outer end is formed with a flange precisely similar to the flange 3' previously described and forms one member of a coupling precisely the same as the coupling heretofore described. The other member of this coupling is formed by the elbow 9, both members being held together by the nut 10 which is precisely the same as the nut 4. Antifriction balls are placed between the flange on the elbow 9 and the inwardly projecting flange of the nut 10. Thus the coupling elbow 9 has a movement of rotation around the axis of the coupling elbow 8 and throughout an entire circle, just as the elbow 8 and the coupling member 4 have a movement of rotation through an entire circle around the axis of the stand pipe 2 and coupling member 3. The upper end of the coupling elbow 9 has a screw threaded engagement with the nozzle 11 of any ordinary description, provided in its interior with the inwardly projecting blades 11' which act to prevent the water from returning or swirling within the nozzle, otherwise than this, the nozzle is formed as in any ordinary or desired manner.

In order to provide for the rotary movement of the coupling elbow 9 upon the elbow 8, I form the elbow 9 with a sprocket wheel or with projecting sprocket studs 12 over which it engages a sprocket chain 12' which hangs downward or extends toward the rear of the device and may be engaged by any suitable mechanism in a manner entirely obvious to those skilled in the art whereby a movement of the sprocket chain in either direction will rotate the coupling elbow 9 and thus rotate the sprocket around the axis of the elbow 8. By drawing this chain to one side or the other but not longitudinally, the nozzle elbow 9, elbow 8 and coupling member 4 may be rotated about the axis of the stand pipe 2 and coupling 3.

Figure 5:
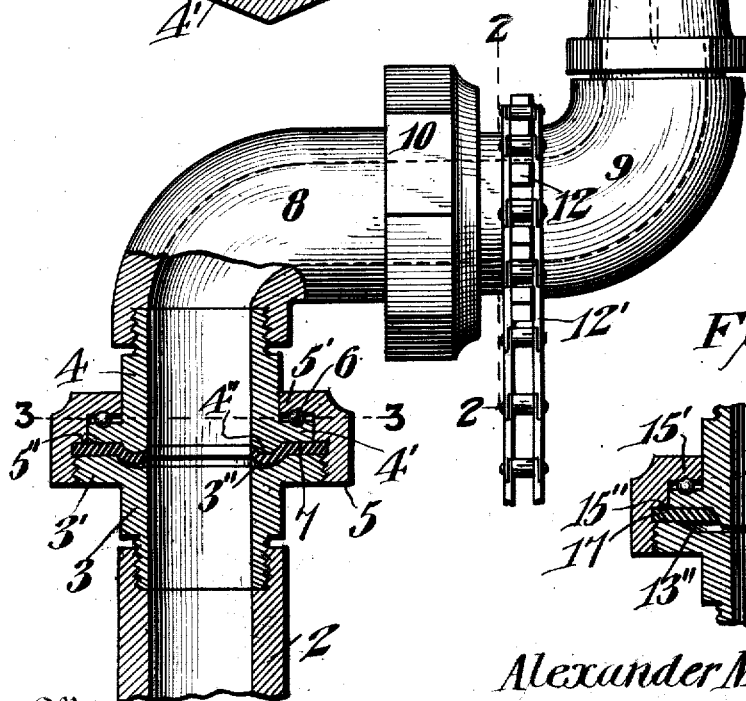
Figure 5:
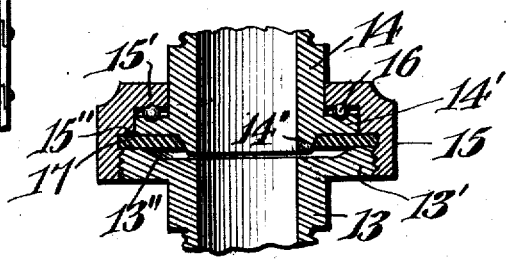

In Fig. 5, I show a modified form of my coupling, wherein 13 designates the lower coupling member equivalent to the coupling member 3, and 13' the outwardly projecting flange screw threaded on its exterior and cut away as at 13''. 14 designates the other member of the coupling having the outwardly projecting flange 14' equivalent to the flange 4' and provided with the balls 16 on its upper surface, contacting with the under surface of the flange 15' on the coupling 15, this coupling being formed with the shoulder 15'', as in the coupling previously described. In this form of my device, the coupling member 14 is provided with the central hub or annular rib 14'' which projects farther than the flange 14' in the previous arrangement, and is not rounded, as the packing ring 17 does not extend over the under face of the rib. The rib or hub is of such depth that when the parts are in position as shown in Fig. 5, the under face of the rib is slightly separated from the upper face of the flange 13' so as to allow liquid to enter the space behind the rib 14''. Held between the upper face of the flange 13' and the shoulder on the nut 15, is the packing ring 17 whose inner circumference bears against the outer circumference of the hub or rib 14''. Thus a space is left between the upper face of the coupling member 13' and the under face of the packing ring. The operation is practically the same as in the form previously described, the water pressure forcing the water into the space between the flanges of the two coupling members and against the under face of the packing ring 13', forcing this packing ring upwardly and forcing upward the coupling member 14 against the antifriction balls 16, thus permitting the coupling member 14 to freely revolve around the axis of the member 13.

It will be seen from the description that the particular advantages of my device reside in the fact that the nozzle may be directed to any point desired, whether in a vertical arc or a horizontal arc, and that the pressure of the water instead of jamming or binding one coupling upon the other, acts to permit the coupling members to have a free revolution. It will also be seen that my form of device is very simple, can be easily made and is thoroughly effective in action.

While I have shown a sprocket chain and sprocket for the purpose of revolving the nozzle, I do not wish to be limited thereto, as any other means may be used for this purpose.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. A swivel coupling for hydraulic apparatus comprising two members in alinement one with the other and one member movable about the longitudinal axis of the coupling with relation to the other member, the relatively fixed member constituting the entrance end of the coupling and the rotatable member constituting the exit end of the coupling, a packing ring carried by the fixed member of the coupling in engagement with the movable member of the coupling, the fixed member of the coupling being cut away to expose a portion of the face of the packing ring toward the entrance end of the coupling to fluid pressure tending to force the packing ring in the same direction as the flow of fluid through the coupling against the rotatable member of the coupling and the said rotatable member having a rib thereon matching and directed toward the cut-away portion of the fixed member, and anti-friction bearings between the two members of the coupling to receive the thrust of the rotatable member due to the flow of fluid through the coupling.

2. A swivel coupling for hydraulic apparatus comprising two flanged members, one being relatively fixed and the other rotatable with relation to the first member about the longitudinal axis of the coupling, the flanged ends of the coupling members being adjacent and the flange of the fixed member extending radially to a greater extent than the flange of the rotatable member and having its periphery screw threaded, a shouldered sleeve threaded for application to the threaded flange of the fixed member and having at the end remote from its shouldered end an inturned flange to overlie the flange of the rotatable member, the said flanges of the rotatable member and of the sleeve having formed therein race ways, anti-friction devices lodged in the race ways to constitute an anti-friction bearing for the rotatable member of the coupling, and a packing ring held to the fixed member by the shoulder of the sleeve applied thereto, the fixed member constituting the entrance end of the coupling and being cut away interiorly adjacent the other member, and the rotatable member having an annular rib adjacent its bore extending toward the other member in the direction of the length of the coupling, the said rib engaging the corresponding portion of the packing ring to force it toward the entrance end of the coupling and the cut away portion of the fixed member forming a space on the face of the packing ring toward the entrance end of the coupling to expose said packing ring to fluid pressure in the direction of flow of fluid through the coupling.

In testimony, that I claim the foregoing as my own, I have hereto affixed my signature in the presence of two witnesses.

ALEXANDER McCOMBIE.

Witnesses:
MICHAEL F. KELEHER,
C. C. TOWNSEND.